United States Patent
Tong

(10) Patent No.: US 9,752,725 B2
(45) Date of Patent: Sep. 5, 2017

(54) MACHINE TOOL PROVIDED WITH A PROTECTION COVER

(71) Applicant: FANUC Corporation, Yamanashi (JP)

(72) Inventor: Zheng Tong, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 21 days.

(21) Appl. No.: 14/792,675

(22) Filed: Jul. 7, 2015

(65) Prior Publication Data

US 2016/0010796 A1 Jan. 14, 2016

(30) Foreign Application Priority Data

Jul. 8, 2014 (JP) .................... 2014-140751

(51) Int. Cl.
| | |
|---|---|
| *F16N 29/02* | (2006.01) |
| *F16N 7/02* | (2006.01) |
| *B23Q 11/08* | (2006.01) |
| *B23Q 11/12* | (2006.01) |

(52) U.S. Cl.
CPC .......... *F16N 29/02* (2013.01); *B23Q 11/0825* (2013.01); *B23Q 11/121* (2013.01); *F16N 7/02* (2013.01)

(58) Field of Classification Search
CPC .................. F16N 29/02; F16N 7/02
USPC .......................................... 184/6.14
See application file for complete search history.

(56) References Cited

U.S. PATENT DOCUMENTS

| | | | | |
|---|---|---|---|---|
| 6,865,963 B2* | 3/2005 | Takanohashi | ........... | B29C 45/83 184/6.21 |
| 9,157,576 B2* | 10/2015 | Divisi | ........ | F16K 1/38 |
| 2007/0029140 A1* | 2/2007 | Smigelski | ............... | F16N 25/04 184/81 |
| 2011/0153094 A1* | 6/2011 | Botha | ..................... | F16N 11/00 700/283 |
| 2013/0015019 A1* | 1/2013 | Kuvaja | .................... | F16N 7/38 184/26 |
| 2015/0068844 A1* | 3/2015 | Strandell | ................ | F16N 29/00 184/6.1 |

FOREIGN PATENT DOCUMENTS

JP 2001-246531 A 9/2001

* cited by examiner

*Primary Examiner* — William E Dondero
*Assistant Examiner* — Mark K Buse
(74) *Attorney, Agent, or Firm* — Hauptman Ham, LLP

(57) ABSTRACT

Provided is a machining tool having a telescopic cover, with a plurality of covers sequentially overlapped and telescopic in the moving direction of the movable portion of the machine tool. The machining includes a lubricant supply unit to supply a lubricant to a slide portion of the telescopic cover.

11 Claims, 3 Drawing Sheets

MACHINE TOOL PROVIDED WITH A PROTECTION COVER

RELATED APPLICATIONS

The present application claims priority to Japanese Application Number 2014-140751, filed Jul. 8, 2014, the disclosure of which is hereby incorporated by reference herein in its entirety.

BACKGROUND OF THE INVENTION

1. Field of the Invention

The present invention relates to a machine tool provided with a protection cover, and particularly to a machine tool provided with a protection cover having a configuration suitable for smooth movement of the protection cover according to a machine movement.

2. Description of the Related Art

In a machine tool, for the purpose of preventing chips generated during machining from piling up on a drive parts of a table, a saddle, or a column, or for the purpose of preventing coolant used in machining from spattering over a drive parts of a table, a saddle, or a column, a telescopic cover is commonly used which expands and contracts in accordance with a movement of a feeding shaft so as to cover these parts (Refer to for example Japanese Patent Laid-Open No. 2001-246531).

A machine tool with a conventional telescopic cover is explained with FIGS. 3A and 3B. FIG. 3A is a top view of the machine tool with the telescopic cover, and FIG. 3B is a front view of the same.

On the bed 1, a table 3 for holding a workpiece 7 is placed through a saddle 2. A column 4 is mounted to the rear side of the bed 1 to support a main spindle 5. A tool 6 is attached to the head of the main spindle 5. A splash guard is provided around the bed 1 to cover the whole machining tool.

A feed mechanism, not shown in FIGS. 3A, 3B is provided between the saddle 2 and the table 3. The table is configured to move in directions of arrows shown in the FIGS. 3A, 3B, by driving the feed mechanism. Telescopic covers 9, 10, 11, and 12, are provided on front side, rear side, and right and left sides of the table 3, in order to protect, for example, the top side of the saddle 2 and the feed mechanism disposed to chips and coolant etc. as the table 3 is moved.

In the machining tool provided with the telescopic cover, explained with FIGS. 3A, 3B, components covered by telescopic covers are protected from chips accumulation and coolant scattering. However, there has been such a problem that, smooth movement of the telescopic covers are prevented by accumulation of cutting chips or wastes on the telescopic covers, by the friction of the cover itself, or by the abrasion or deformation of the cover itself, causing damage of the telescopic covers or deterioration of machining accuracy.

SUMMARY OF THE INVENTION

Therefore, an object of the invention is to provide a structure suitable for smooth movement of a protection cover for a machining tool provided with the protection cover such as a telescopic cover, which moves with movement of a machining unit.

According to the present invention, there is provided a machining tool having a plurality of covers sequentially overlapped and telescopic in the moving direction of the movable portion of the machine tool. The machining tool includes a lubricant supply unit configured to supply a lubricant to a slide portion of the telescopic cover.

The lubricant supply unit may further includes a lubricant supply amount adjustment unit configured to adjust an amount of a lubricant, supplied to a slide portion of the telescopic cover by the lubricant supply unit.

The lubricant supply amount adjustment unit may change a lubricant supply amount based on the position of slide portion of the telescopic cover to which the lubricant is supplied.

The lubricant supply amount adjustment unit may change a lubricant supply amount based on machining condition.

The lubricant supply amount adjustment unit may change a lubricant supply amount based on material of a workpiece to be machined.

The lubricant supply amount adjustment unit may change a lubricant supply amount based on an operation time of the machining tool.

The lubricant supply unit may include a lubricant drip frequency adjustment unit configured to adjust a lubricant supply frequency from the lubricant supply unit to a slide portion of the telescopic cover.

The lubricant drip frequency adjustment unit may adjust the lubricant supply frequency based on a point of the slide portion of the telescopic cover to supply the lubricant.

The lubricant drip frequency adjustment unit may adjust the lubricant supply frequency based on machining condition.

The lubricant drip frequency adjustment unit may adjust the lubricant supply frequency based on material of workpiece to be machined.

The lubricant drip frequency adjustment unit may adjust the lubricant supply frequency based on machining tool operation time.

In the invention with the configuration above, smooth movement of the telescopic cover provided in the machining tool is enabled. In addition, it is possible in the invention to prevent the damage of telescopic cover and the deterioration of machining accuracy, by appropriately corresponding to, difference of cutting chips accumulation amounts caused by different positions of telescopic cover, difference of cutting chips generation rate caused by machining condition, difference of cutting chips character caused by workpiece material difference, difference of machining tool operation time and operation condition.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

In the description hereinafter, same remarks are used to the same or resemble configuration.

Figure 1A:
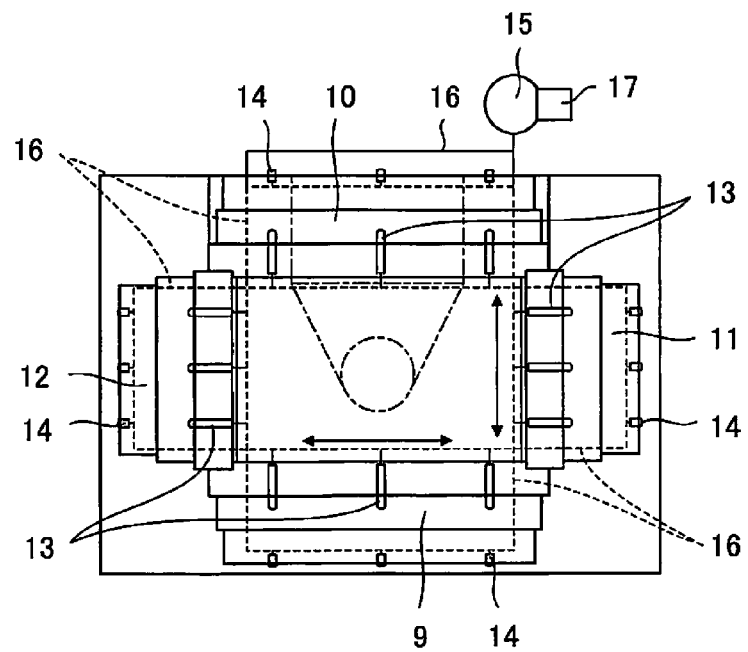
FIGS. 1A, 1B are views showing a machine tool of one embodiment of the invention.
Figure 1B:
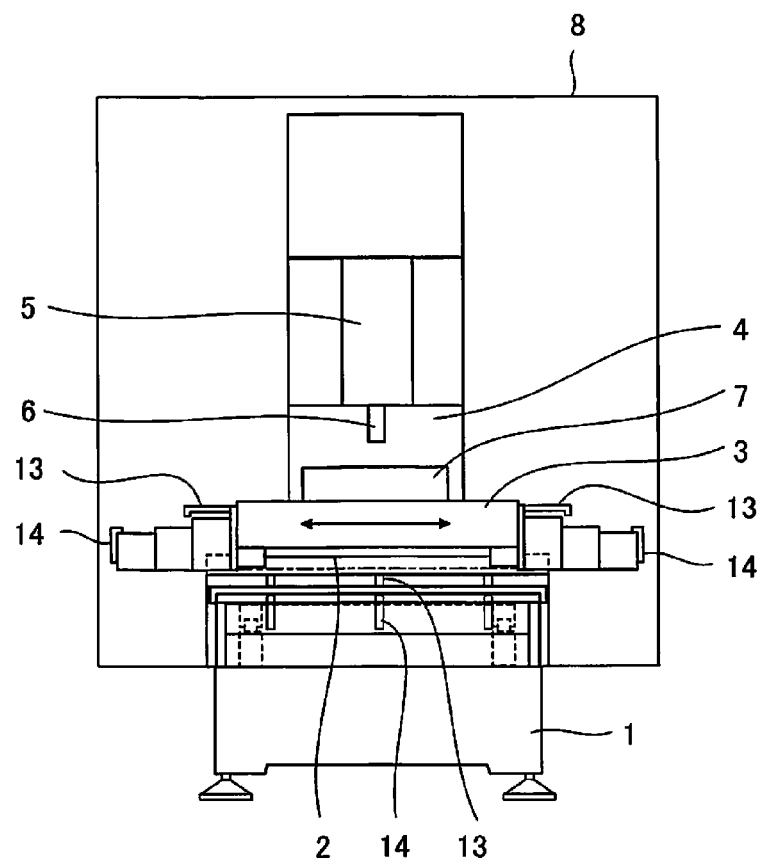
Figure 3A:
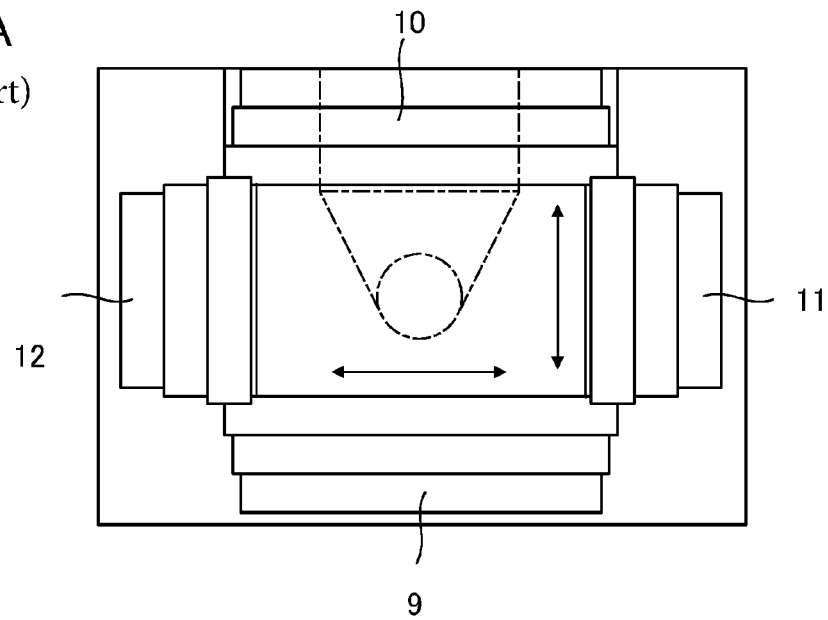
FIGS. 3A, 3B are views showing a machine tool provided with a conventional telescopic cover.
Figure 3B:
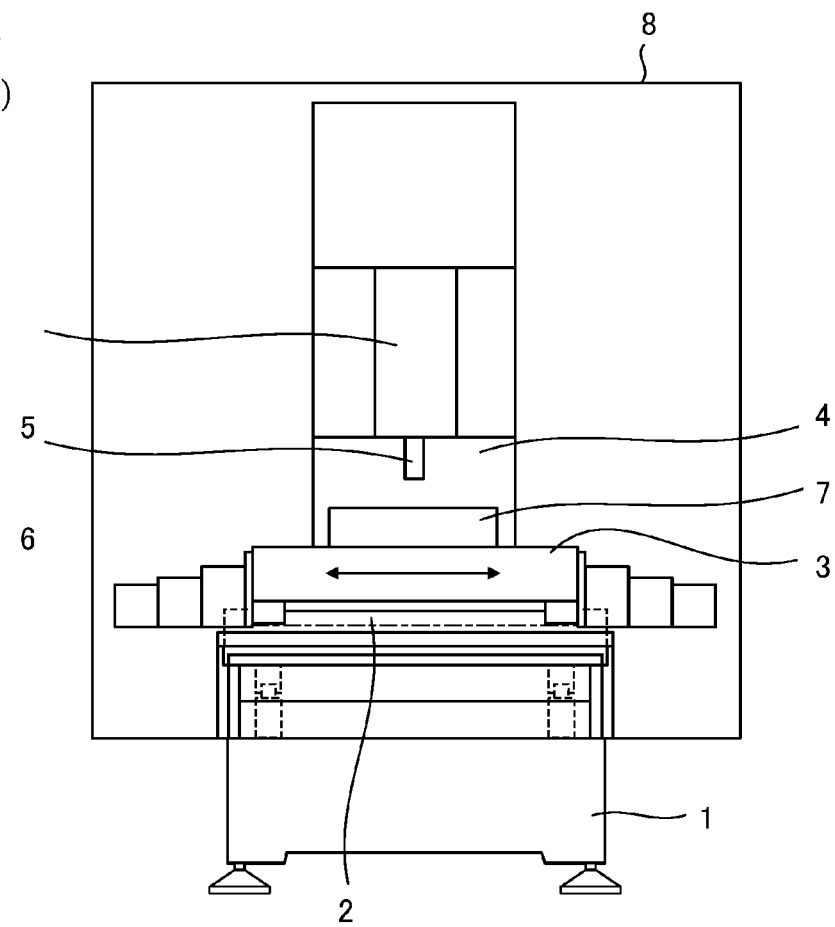

A machining tool provided with a telescopic cover in one embodiment of the invention is explained with the FIGS. 1A and 1B. FIG. 1A shows a top view of a machine tool provided with a telescopic cover of the present embodiment, and the FIG. 1B shows a front view of the same. Basic configuration of the machining tool of the embodiment is same as the configuration of the conventional machining tool with the telescopic cover explained with the FIGS. 3A, 3B.

In the machining tool of the present embodiment, two kinds of lubricant supply units are installed in the neighborhood of telescopic covers 9, 10, 11, and 12. One of the lubricant supply units is a moving part side lubricant supply unit 13 installed in the moving part of the telescopic covers 9, 10, 11, and 12, and the other is a fixed side lubricant supply unit 14 installed in the fixed part of the telescopic covers 9, 10, 11, and 12. Lubricant is supplied to the two kinds of lubricant supply units from a lubricant supply equipment 15 via a lubricant supply channel 16 so as to properly drip lubricant on a surface of the telescopic covers 9, 10, 11, 12.

In the machining tool of the present embodiment, a lubricant supply amount adjustment unit 17 may be installed in the lubricant supply equipment 15, so as to adjust a lubricant supply amount when a lubricant is dripped on the surface of the telescopic covers 9, 10, 11 and 12 depending on the various conditions.

As an example of the lubricant supply amount adjustment unit installed in the lubricant supply equipment 15, a lubricant drip amount adjustment unit for adjusting a drip amount of the lubricant may be installed. When the lubricant is dripped on the surface of the telescopic covers 9, 10, 11, and 12, the lubricant drip amount adjustment unit may be operated to change and adjust a lubricant supply amount by changing the drip amount, based on the dripping point at the same time considering a number of moving part side lubricant supply units 13 and fixed side lubricant supply units 14, and based on the material of the workpiece to be machined. The lubricant drip amount adjustment unit may be implemented as a button, a knob or a lever on a control panel of the lubricant supply equipment 15. Any configuration that can adjust a lubricant supply amount by hand is adopted.

In addition, the lubricant supply amount may be changed and adjusted in the lubricant supply equipment 15 to change the lubricant drip amount, based on machining condition or a commanded value for machining such as a main spindle rotation speed or a feed rate in a machining program.

Furthermore, the lubricant supply amount may be changed and adjusted in the lubricant supply equipment 15 to change the lubricant drip amount based on a use period or an operation time of the machining tool.

A controller, not shown in the figures, may give a command to change and adjust the lubricant supply amount in order to change the lubricant drip amount, instead of adjusting the lubricant supply amount by hand using the lubricant drip amount adjustment unit in the lubricant supply equipment 15. This configuration enables an automatic control of drip amount based on a parameter of, above-mentioned, the drip position, the workpiece material, the machining condition or the command value for machining such as a rotation speed of a main spindle or feed rate.

In addition, as another example of the lubricant supply amount adjustment unit 17 installed in the lubricant supply equipment 15, the lubricant supply amount adjustment unit 17 may be implemented as a lubricant drip frequency adjustment unit for change and adjust a lubricant dripping frequency. More specifically, when lubricant is dripped on a surface of the telescopic covers 9, 10, 11, and 12, the lubricant drip frequency adjustment unit may be operated to change the lubricant drip frequency, based on the dripping point at the same time considering a number of moving part side lubricant supply units 13 and fixed side lubricant supply units 14, and based on material of a workpiece to be machined. The lubricant drip frequency adjustment unit may be implemented as a button, a knob or a lever on the control panel of the lubricant supply equipment 15. Any configuration that can adjust a lubricant drip frequency by hand is adopted.

In addition, the lubricant drip frequency may be changed by the lubricant drip frequency adjustment unit in the lubricant supply equipment 15 to change the lubricant drip amount, based on machining condition or a commanded value for machining such as a main spindle rotation speed or feed rate in a machining program.

In addition, the lubricant drip frequency may be changed in the lubricant supply equipment 15 to change the lubricant drip frequency based on a use period or an operation time of the machining tool.

A controller, not shown in the figures, may give a command to the lubricant supply equipment 15 in order to change the lubricant drip frequency using the lubricant drip frequency adjustment unit, instead of adjusting the lubricant drip frequency by hand using the lubricant drip amount adjustment unit in the lubricant supply equipment 15. This configuration enables an automatic control of drip frequency based on a parameter of, above-mentioned, the drip position, the workpiece material, the machining condition and the command value for machining such as a rotation speed of a main spindle or feed rate.

Based on a form of each part of machining tool and operation condition, appropriate forms and numbers of moving part side lubricant supply units 13 and fixed side lubricant supply units 14 may be chosen. In addition, as for the lubricant, an oil or a grease supplied to a ball screw or a linear guide may be used.

The application of the invention is not limited to an example of supplying lubricant to such a telescopic cover that protects components disposed as a table is moved explained in the present embodiment, but also applicable to a machining tool with the other configuration of, for example, a column is moved.

Figure 2A:
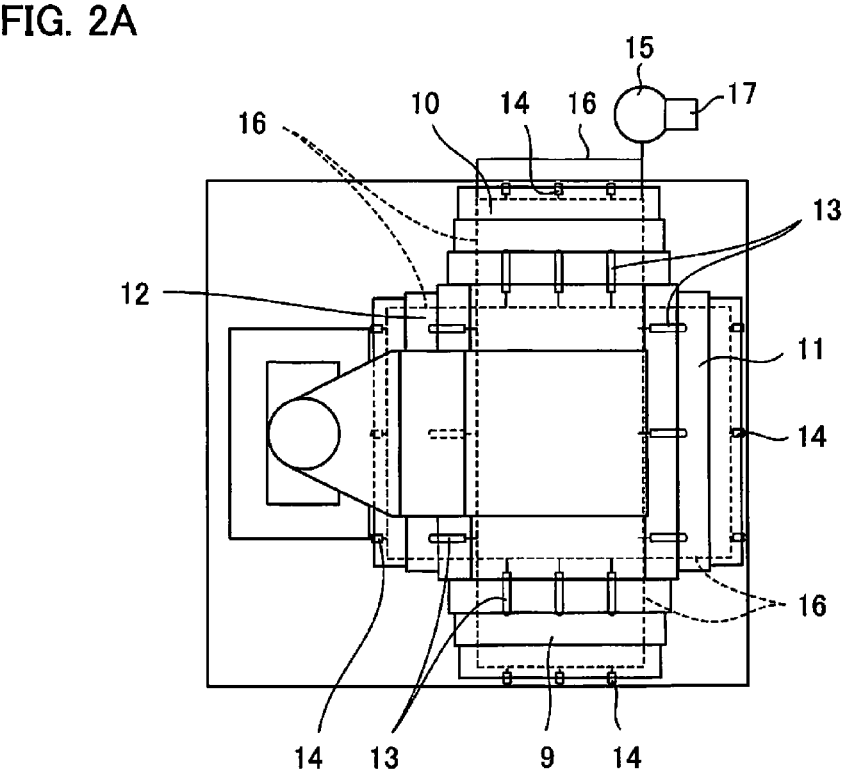
FIGS. 2A, 2B are views showing a machine tool of the second embodiment of the invention.
Figure 2B:
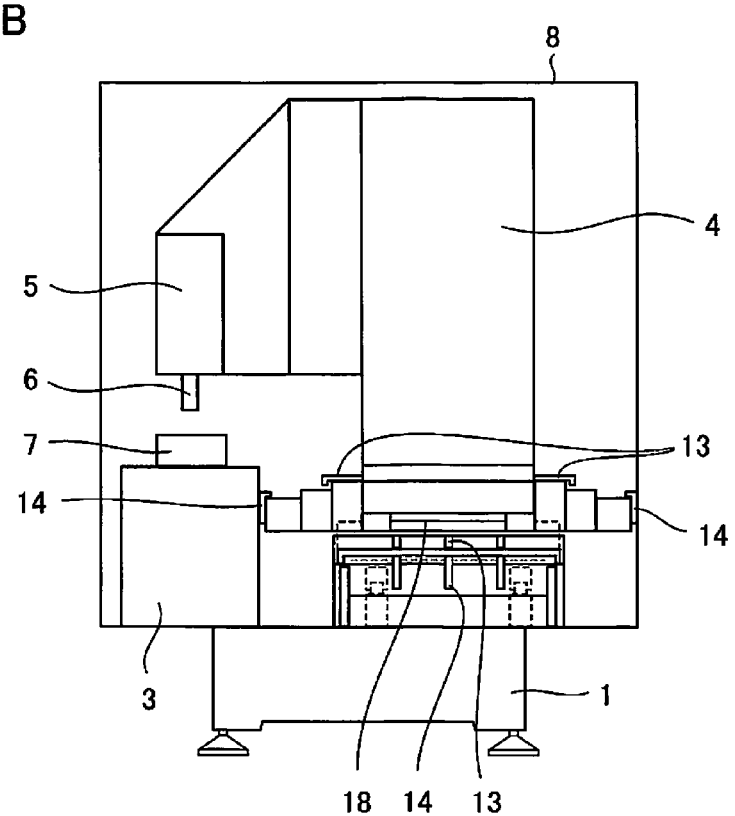

FIG. 2A is a top view of a machine tool provided with a telescopic cover with a configuration that a column is moved, and FIG. 2B is a side view of the same.

In the machining tool shown in FIGS. 2A and 2B, a table 3 for securing a workpiece 7 is directly mounted on the bed 1. On the bed 1, column 4 is mounted via the base 18. A tool 6 is attached to the head of the main spindle 5, and the column 4 supports the main spindle 5. A splash guard 8 is provided around the bed 1 to cover the whole machining tool.

A feed mechanism, not shown in the figures, is provided between the base 18 and the column 4. The column 4 is moved by driving a feed mechanism. Telescopic covers 9, 10, 11, and 12 are provided on the front side, rear side, and right and left sides of the table 3, in order to protect, for example, the top side of the saddle 2 and the feed mechanism, disposed to chips or the like, as the column 4 is moved.

In this configuration, two kinds of lubricant supply units, i.e., a moving part side lubricant supply unit 13 and a fixed side lubricant supply unit 14, are installed in the neighborhood of the telescopic covers 9, 10, 11, and 12. Lubricant is supplied to the two kinds of lubricant supply units from a lubricant supply equipment 15 via a lubricant supply channel 16 so as to properly drip a lubricant on a surface of the telescopic covers 9, 10, 11, 12, to achieve the above mentioned effect.

The invention claimed is:

1. A machining tool, comprising:
   a telescopic cover having a plurality of covers sequentially overlapped and telescopic in a moving direction of a movable portion of the machine tool; and
   lubricant supply units configured to supply a lubricant to a surface of the telescopic cover,
   wherein
   the telescopic cover has
     a fixed part, and
     a moving part movable in the moving direction relative to the fixed part, and
   the lubricant supply units are installed at both the moving part and the fixed part of the telescopic cover.

2. The machining tool according to claim 1, further comprising:
   a lubricant supply amount adjustment unit configured to adjust an amount of the lubricant supplied to the surface of the telescopic cover by the lubricant supply units.

3. The machining tool according to claim 2, wherein
   the lubricant supply amount adjustment unit is configured to adjust the amount of the lubricant based on a drip position of the lubricant on the surface of the telescopic cover.

4. The machining tool according to claim 2, wherein
   the lubricant supply amount adjustment unit is configured to adjust the amount of the lubricant based on a machining condition of the machining tool.

5. The machining tool according to claim 2, wherein
   the lubricant supply amount adjustment unit is controllable to adjust the amount of the lubricant based on a material of a workpiece to be machined by the machining tool.

6. The machining tool according to claim 2, wherein
   the lubricant supply amount adjustment unit is configured to adjust the amount of the lubricant based on an operation time of the machining tool.

7. The machining tool according to claim 1, further comprising:
   a lubricant drip frequency adjustment unit configured to adjust a lubricant supply frequency of the lubricant from the lubricant supply units to the surface of the telescopic cover.

8. The machining tool according to claim 7, wherein
   the lubricant drip frequency adjustment unit is configured to adjust the lubricant supply frequency based on a dripping point of the lubricant on the surface of the telescopic cover.

9. The machining tool according to claim 7, wherein
   the lubricant drip frequency adjustment unit is configured to adjust the lubricant supply frequency based on a machining condition of the machining tool.

10. The machining tool according to claim 7, wherein
    the lubricant drip frequency adjustment unit is controllable to adjust the lubricant supply frequency based on a material of a workpiece to be machined by the machining tool.

11. The machining tool according to claim 7, wherein
    the lubricant drip frequency adjustment unit is configured to adjust the lubricant supply frequency based on an operation time of the machining tool.

* * * * *